J. REHAK & J. H. MADIGAN.
POSTMARKING MACHINE.
APPLICATION FILED OCT. 27, 1911.

1,051,159.

Patented Jan. 21, 1913.

Witnesses:
Inventors:
James Rehak
John H. Madigan
By David H. Fletcher
Atty.

J. REHAK & J. H. MADIGAN.
POSTMARKING MACHINE.
APPLICATION FILED OCT. 27, 1911.

1,051,159.

Patented Jan. 21, 1913.
8 SHEETS—SHEET 6.

Fig. 8.

Witnesses:
Inventors:
James Rehak
John H. Madigan
By David H. Fletcher,
Atty.

J. REHAK & J. H. MADIGAN.
POSTMARKING MACHINE.
APPLICATION FILED OCT. 27, 1911.

1,051,159.

Patented Jan. 21, 1913.
8 SHEETS—SHEET 7.

Witnesses:

Inventors:
James Rehak,
John H. Madigan,
By David H. Fletcher,
Atty.

J. REHAK & J. H. MADIGAN.
POSTMARKING MACHINE.
APPLICATION FILED OCT. 27, 1911.

1,051,159.

Patented Jan. 21, 1913.
8 SHEETS—SHEET 8.

Witnesses:

Inventors:
James Rehak
John H. Madigan
By David H. Fletcher
Atty.

UNITED STATES PATENT OFFICE.

JAMES REHAK AND JOHN H. MADIGAN, OF CHICAGO, ILLINOIS.

POSTMARKING-MACHINE.

1,051,159.  Specification of Letters Patent.  Patented Jan. 21, 1913.

Application filed October 27, 1911. Serial No. 657,171.

*To all whom it may concern:*

Be it known that we, JAMES REHAK and JOHN H. MADIGAN, citizens of the United States, residing at Chicago, in the county of Cook and State of Illinois, have invented certain new and useful Improvements in Postmarking-Machines, of which the following is a description, reference being had to the accompanying drawings, forming a part of this specification, in which corresponding numerals of reference in the different figures indicate like parts.

The object of our invention is to provide a post-marking machine which shall be simple and compact and so constructed as to avoid the use of the usual feed-belts and other complicated and objectionable features, by utilizing a combined impression and feed-wheel or roller of relatively large diameter and so constructed as to feed the mail pieces to separating, marking and stacking mechanisms and that regardless of the special construction or character of said mechanism.

A further and more specific object is to provide a simple and effective timing element in conjunction with a die, normally at rest, which timing element may be so constructed as to be controlled by the mail-piece so as to cause said die to be brought into action in harmony with the movement of the mail-piece.

Moreover it is our purpose to provide simple means whereby the movement of the timing element may serve to actuate a registering or counting mechanism.

To these and other subsidiary ends, our invention consists in the combination of elements hereinafter more particularly described and definitely pointed out in the claims.

In the drawings,
Fig. 2, Fig. 10, is a like view taken upon the line 10,
Fig. 2, Fig. 11, is a like view taken upon line 11,
Fig. 2, Fig. 12, is a like view taken upon the line 12,
Fig. 3, Fig. 13, is a plan view of a portion of the machine, in which the feed rollers are removed showing a modification of said invention, so far as it relates to the trip finger and means for stopping the same,
Fig. 14, is a detail view of the trip finger shown in Fig. 13, Fig. 15, is a vertical sectional view taken upon the line 15, Fig. 13, viewed in the direction of the arrow there shown,
Fig. 16, is a plan view of the die, trip finger and coacting parts as they would appear when in abnormal positions, and Fig. 17, is a vertical sectional view taken upon the line 17, Fig. 13, viewed in the direction of the arrow there shown.

Figure 6:
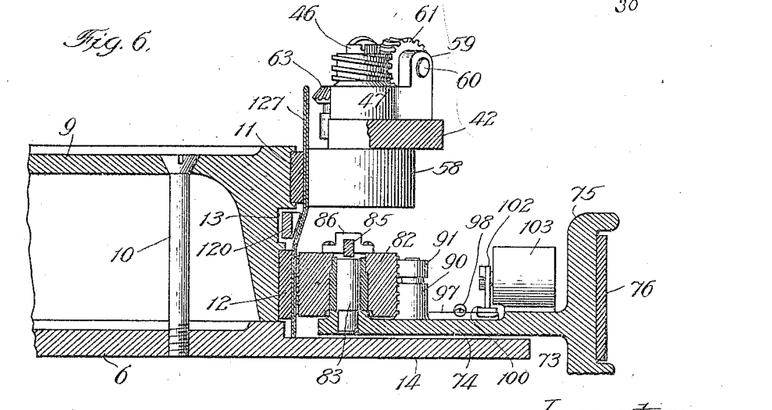
Fig. 6, is a vertical sectional view taken upon the line 6, Fig. 4, viewed in the direction of the arrow there shown.
Figure 7:
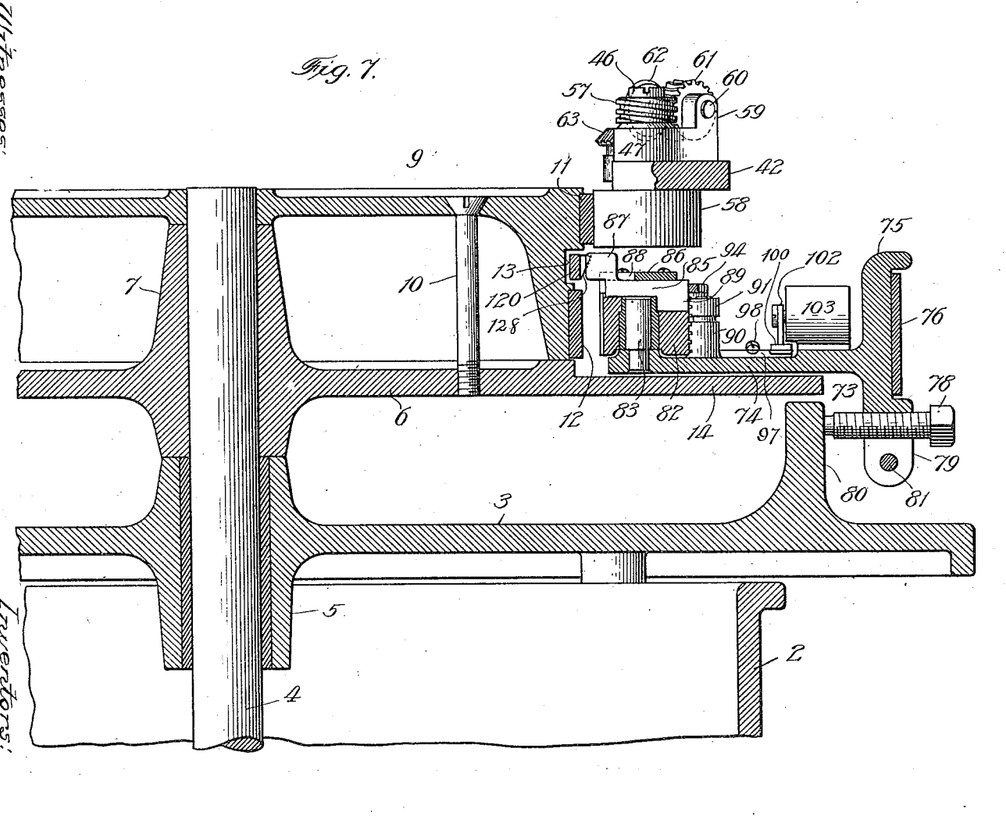
Fig. 7, is a like view taken upon the line 7—7, Fig. 1, viewed in the direction of the arrow there shown.
Figure 8:
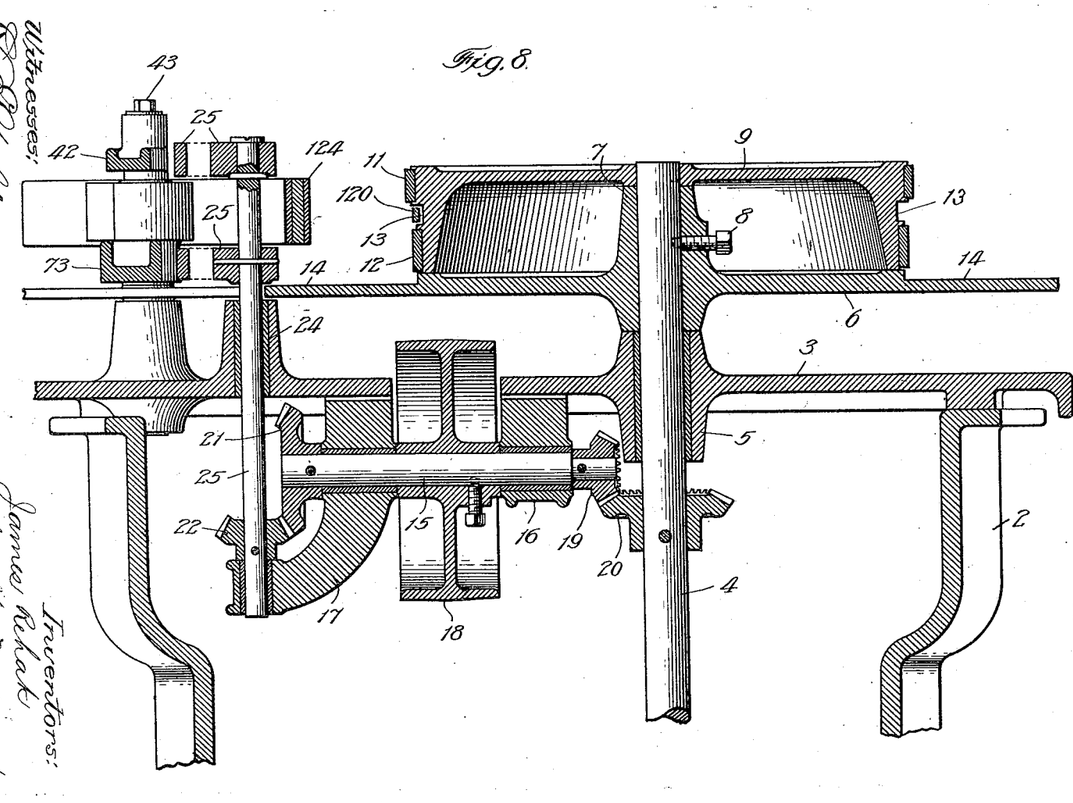
Fig. 8, is a like view taken upon the line 8, Fig. 1, viewed in the direction of the arrow there shown.

Referring to the drawings, 1, Figs. 1, 2, 3, 4, 5, and 9, represents a table supported upon a suitable frame or casing 2, Figs. 7 and 8, provided also with a horizontal plate 3, upon a lower level than that of the table proper, to provide bearings for the shafts as hereinbefore stated. A vertical shaft 4, has one bearing 5, in the frame-plate, and another, not shown, preferably in the lower part of the frame. Mounted upon the upper end of the shaft 4 is a disk 6, Figs. 6, 7, 8, and 9, having a hub 7, which is rigidly secured to the shaft by means of a set-screw 8. A combined feed and impression wheel or roller, generally designated by 9, is also mounted upon said shaft above the disk and rigidly attached to the latter by means of bolts 10. Friction surfaces 11, and 12, respectively, are formed from india rubber or equivalent material upon the upper and lower portions of the face of said roller, the former preferably projecting beyond the latter, while a groved space 13, is interposed between them for the purpose hereinafter stated.

The disk 6, is provided with a peripheral flange 14, the upper surface of which is in a common plane with that of the table, and is intended as a rest for the lower edges of the mail-pieces and to aid in feeding said pieces to the separating marking and stacking mechanisms.

A horizontal driving shaft 15, Fig. 8, is journaled in bearings formed in brackets 16 and 17, attached to the lower face of the plate 3. A pulley 18, upon said shaft is adapted to be driven by a motor not shown, which may be inclosed within the casing 2. A beveled pinion 19 upon the shaft 15 is adapted to engage a like pinion 20 upon the shaft 4. A beveled pinion 21 upon the opposite end of the shaft 15 is arranged to mesh with a similar pinion 22, upon a vertical shaft 23, the lower end of which is journaled in a bearing in the bracket 17, while the upper portion is supported in a secondary bearing 24, in the plate 3. A stacking wing 25, of well known construction, shown also in Figs. 1 and 2, is mounted upon the upper end of the shaft 23, by which it is adapted to be driven.

Figure 1:
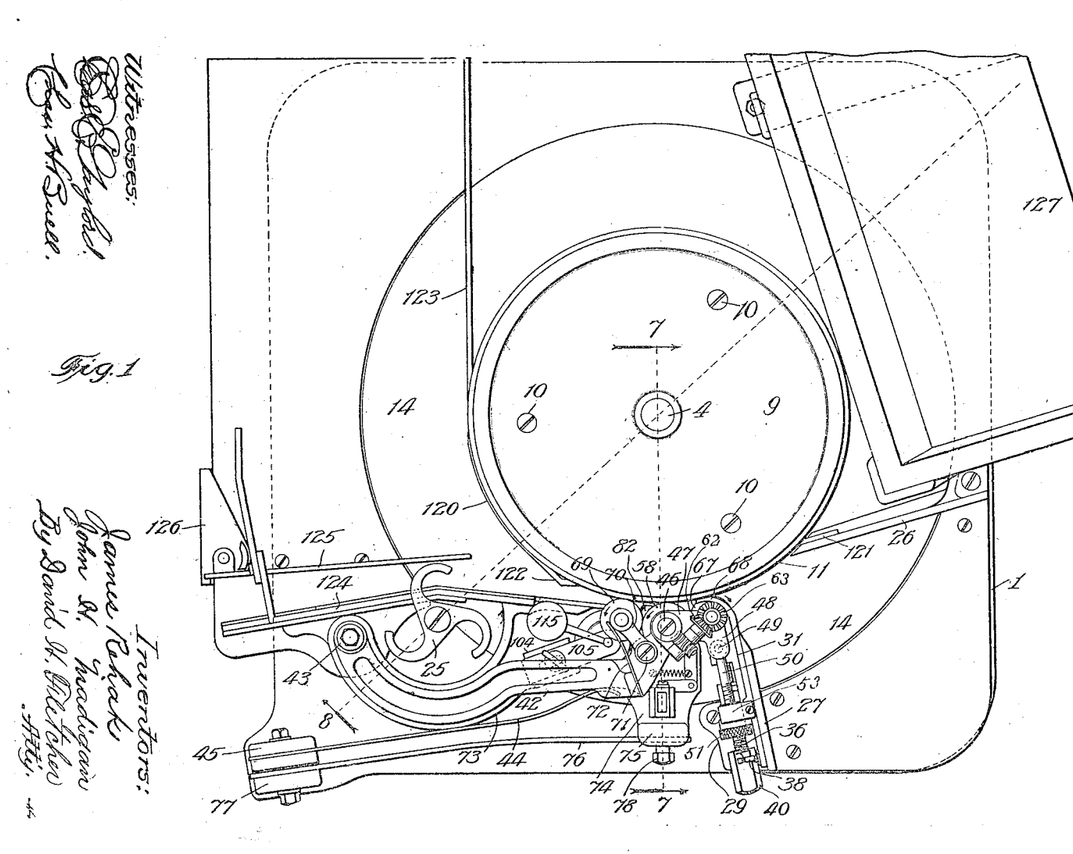
Figure 1, is a plan view of a post-marking machine embodying the features of our invention.
Figure 2:
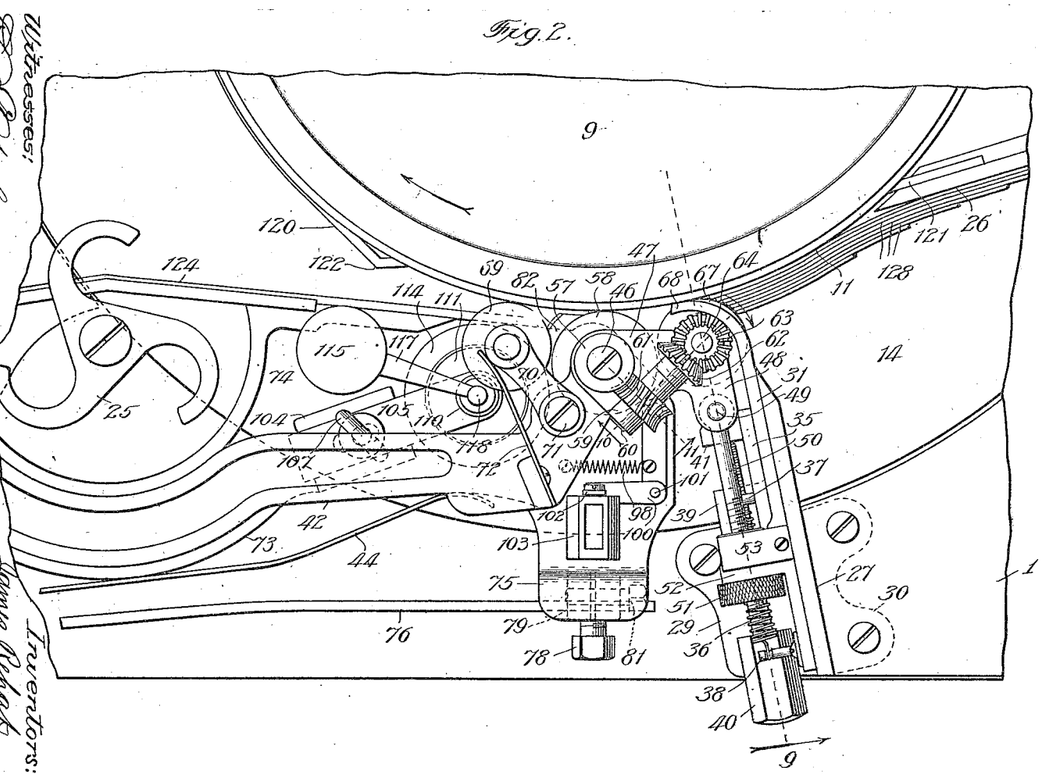
Fig. 2, is a like enlarged view of a portion thereof.

A vertical shield or guard 26, Figs. 1 and 2, is rigidly attached in any approved way to the top of the table and extended over the flange 14, to a position close to the periphery of the combined feed and impression roller 9, and arranged tangentially or substantially so, to said roller; said shield serving as a backing or support for the mail-pieces to be marked, which are placed against said shield with the foremost one in operative proximity to a separating mechanism about to be described.

Figure 9:
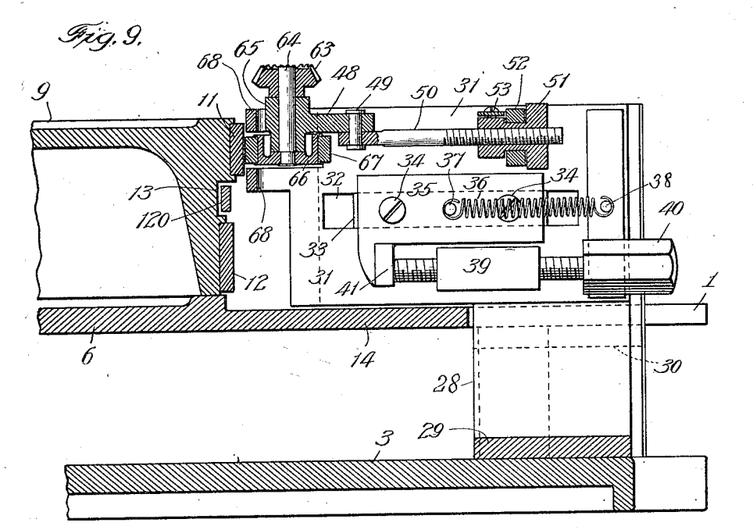
Fig. 9, is a like view taken upon the line 9.
Figure 10:
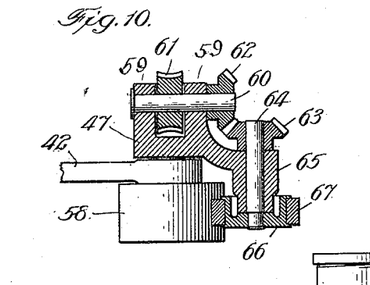

A secondary vertical shield 27, arranged in a plane at an angle to that of the shield 26, is extended upwardly from the frame-plate 3, as shown at 28, Fig. 9, one portion thereof being attached by means of a flange 29 to said plate, Figs. 1 to 4 inclusive, while a like flange 30, indicated in dotted lines, is attached to the bottom of said table. A plate 31, has a horizontal longitudinal slot 32, which is fitted to slide upon a guide-block 33, Figs. 4 and 9, rigidly attached to the part 27, to which block, in turn, is secured by means of screws 34, a retaining plate 35. A coiled spring 36, has one end attached to a pin 37, upon said stationary retaining plate while the other end is attached in like manner to a pin 38, upon the plate 31. A boss or lug 39, is formed upon or rigidly attached to the face of the plate 31, into which is tapped an adjusting screw 40, the inner end of which is adapted to engage a banking or shoulder 41, upon the retaining plate 35, against which it is normally held by the spring 36.

A swinging arm 42, Figs. 1, 2, 6 and 10, is pivoted to a stud 43, Fig. 1, upon the table, said arm being held in a normal position by means of a spring 44, one end of which is attached to a rigid support 45. Said arm is intended to serve different functions, one of which, in conjunction with the sliding plate 31, will first be explained. Pivotally mounted upon an axis indicated by the screw 46, Figs. 1, 2, 6, and 9, upon the free end of the arm 42, is an irregular shaped member or fitting 47, in the nature of a link, having a lug 48, also shown in Fig. 11, which is jointedly connected at 49, to a screw-threaded adjusting-rod 50, having a thumb-nut, 51 thereon, better shown in Figs. 2 and 9, which is swiveled in a lug 52, upon the plate 31. A guard 53, is attached to the plate 31 and extended over the smaller portion of the nut, so that only the larger part may be grasped by the user.

Figure 11:
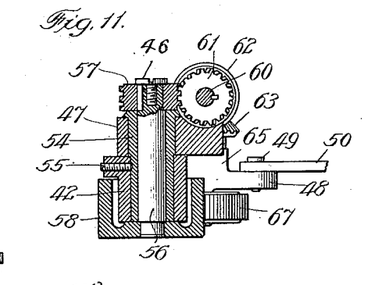
Figure 12:
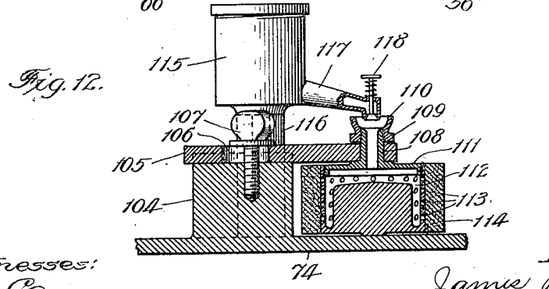

Projected downwardly through a bore in the end of the arm 42, is a bearing sleeve 54, Fig. 11, which is rigidly secured in said bore by means of a set-screw 55. Said sleeve is extended above the arm as shown and said extended portion forms a bearing for the member 47, which is journaled thereon. A shaft 56, is journaled in said sleeve and splined upon the upper end thereof is a worm 57, held in place by the screw 46. Upon the lower end of the shaft 56, is mounted a feed roller 58, Figs. 1, 2, 6, 7, 10 and 11, which is normally pressed against the friction surface 11, of the main feed wheel 9, by the action of the spring 44, and is driven by frictional contact therewith, or with an interposed mail-piece. Journaled in bearings, formed in lugs 59, upon the member 47, is a shaft 60, upon which is keyed a worm-wheel 61, adapted to be driven by the worm 57. A beveled gear 62, upon the end of said shaft, is in mesh with a like gear 63, upon the upper end of a vertical shaft 64, which is journaled in a bearing 65, more clearly shown in Figs. 9 and 10. Upon the lower end of the shaft 64, is mounted a retarding roller 66, having a friction surface 67. Said retarding roller is adjusted so that its periphery will be close to, but out of contact with the surface 11, of the feed-wheel and the gears are so arranged as to drive said retarding roller in a direction opposed to that of the feed-wheel as indicated by the arrow. Said retarding roller is interposed between two curved guard fingers or shields 68, Figs. 1, 2 and 9, formed upon the plate 31. It will be seen by reference to Fig. 9, that the adjustment of the position of the retarding roller is controlled by the screw-rod 50 and the adjusting nut 51; and in as much as it is connected by means of said rod to the plate 31 and is adapted to be moved therewith, its normal position with respect to the feed-wheel, is controllable by means of the adjusting screw 40.

In addition to the feed roller 58, which is located immediately above the marking die, about to be described, we prefer to employ an auxiliary feed roller 69, Figs. 1 and 2, which is located in advance of the roller 58, and journaled upon the free end of an arm 70, the opposite end of which is pivotally connected by means of a screw 71, to the arm 42. A spring 72, having one end rigidly attached to the arm 42, is arranged to bear against the free end of the arm 70, so as to press the roller 69, against the periphery of the main feed-wheel.

From the foregoing it will be apparent that the retarding roller and the respective feed-rollers 58 and 69, are each free to yield independently of each other to permit the passage of thick and thin mail pieces, while at the same time the retarding roller will be driven by the movement of the feed-roller 58.

Having described the feeding elements, we will now consider the marking mechanism.

An arm 73, is pivoted upon a stud, the axis of which is indicated at 43, said arm being beneath the arm 42, Figs. 1 to 8 inclusive. The free end of said arm is widened out into a flat horizontal plate as shown at 74, for the purpose of carrying certain parts thereon as hereinafter described. A vertical flange 75, is formed upon said arm to serve as a bearing point for a flat spring 76, the opposite end of which is attached to a stud 77, Fig. 1, upon the frame. An adjusting screw 78, better shown in Fig. 7, is tapped into a split lug 79, so that its inner end may rest against a banking 80, upon the frame. A tightening screw 81, enables the screw 78, to be locked in position, in a well known way, so as to hold it in adjustment.

Figure 3:
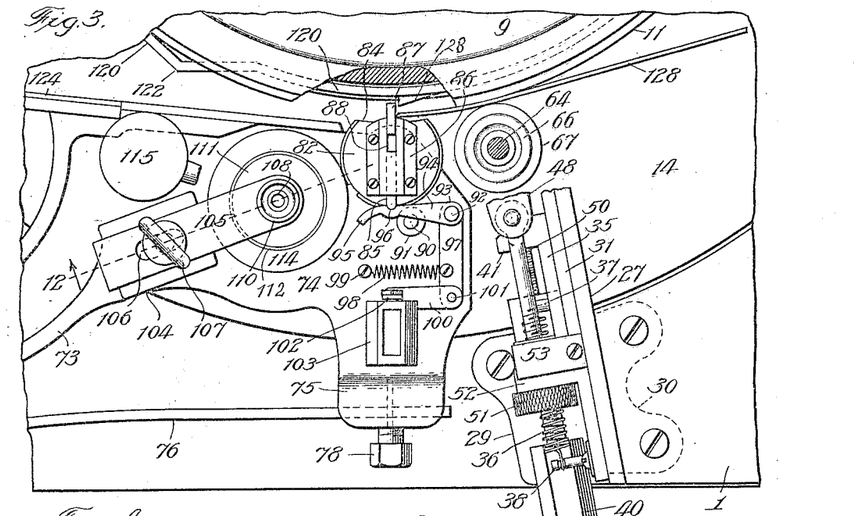
Fig. 3, is a like view showing the main feed wheel broken away, and parts of the feed mechanism removed and a mail-piece in position to engage the timing member.
Figure 4:
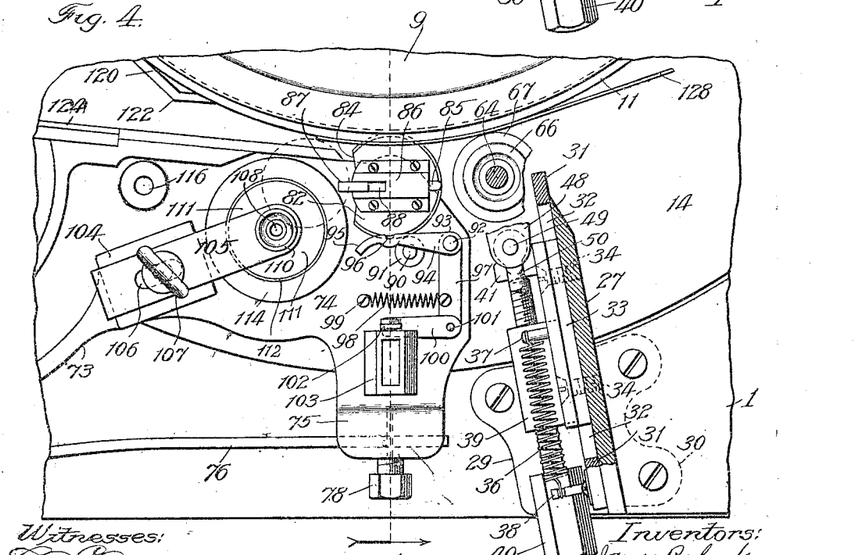
Fig. 4, is a like view showing the mail-piece and letter in different relative positions.
Figure 5:
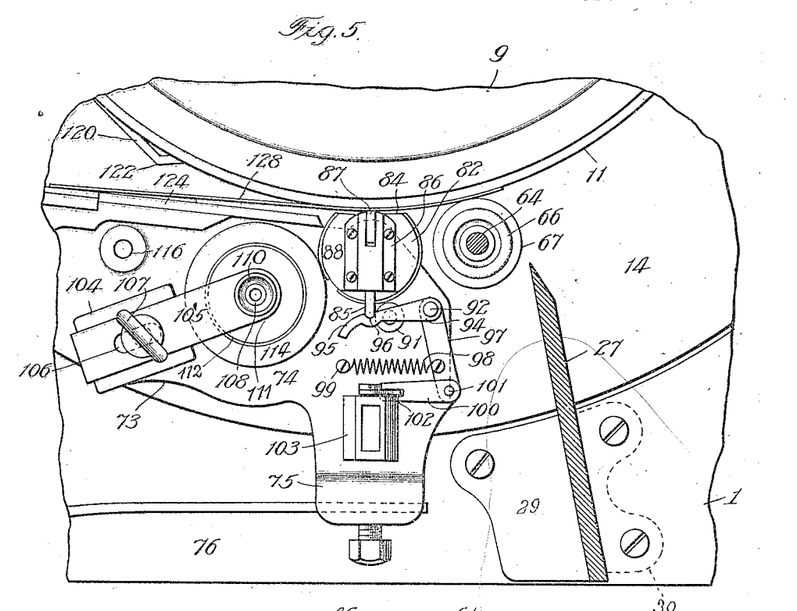
Fig. 5, is a like view showing the relative positions of the parts after one revolution of the marking die and while a portion of the mail-piece is still present to hold the timing member in an abnormal position.

A marking roller, generally designated by 82, having a die upon its periphery, is journaled upon a stud 83, Figs. 6 and 7, arranged to project upwardly from the flat portion 74, of the arm 73. Said marking roller is cut away as shown at 84, Figs. 3, 4 and 5, and is provided with a diametrical groove across the top which serves as a partial guide for a sliding timing member, generally designated by 85, which is loosely secured in place by means of a housing 86, rigidly attached by means of screws as shown to the top of the roller. The normal position of the marking roller is indicated in Fig. 3, with the cutaway portion adjacent to the mail-piece path, and the forward or timing end of said timing member extending across said path. The forward end of said member is provided with an upwardly projecting portion 87, which is adapted to extend above the housing as shown in Fig. 7, and preferably somewhat within the circle described by the feed or friction surface 11, upon the feed-wheel 9. Said raised portion is adapted to move backwardly in a slot 88, in the housing, the end of which forms a stop therefor. The rear end of said timing member is provided with a depending portion 89, which is the reverse of that in front. The length of said part is such that it is caused to bank against a bushing in the wheel which serves to limit the forward movement of said timing member. A stud 90, is formed upon the part 74, which is provided with a friction roller 91, upon its upper end. Said roller is so placed as to enable the forward end 87, of the timing stop to pass above it when the marking wheel is rotated and to permit the rear or depending part 89, to pass it without contact when said timing element is in its normal position as shown in Fig. 3, but when reversed, as shown in Fig. 5, said roller lies directly in its path and serves as a stop to prevent the further rotation of the marking wheel and cause it to come to rest in its normal position. Journaled upon a stud 92, projecting upwardly from the plate 74, is a sleeve 93, to the upper end of which is secured a rigid arm 94, preferably integral therewith and extending laterally therefrom. The free end of said arm is curved outwardly as shown at 95, which is adapted to engage the end of the timing member for the purpose hereinafter stated. An arm 97, arranged substantially at right angles to the arm 94, is formed upon, or rigidly attached to the lower end of the sleeve 93, said sleeve and arms forming in effect an elbow lever. A coiled spring 98, one end of which is attached to the arm 97, and the other to a stud 99, upon the plate, serves to retain said lever in a normal position with the arm 94 pressing against the end of the timing member as shown in Fig. 3. A link 100 has one end jointedly connected at 101 to the arm 97, while the other is connected in like manner to the lower end of an arm 102, the upper end of which is rigidly connected to the shaft of a counting mechanism of well known construction contained within a casing 103.

The inking mechanism, which embodies certain novel characteristics, may be described as follows: Formed upon the plate portion 74 of the arm 73, Figs. 1, 2, 3, 4, 5, and 12, is a stud or guide-block 104, having a groove in the top, in which is fitted an arm 105, having a longitudinal slot 106, therein, through which is projected a thumb-screw 107, to hold said arm in place when adjusted. A tube 108, is journaled in a vertical bore in the end of the arm 105, being held in place by a nut 109 threaded thereon, the upper portion of said nut being formed into a funnel or cup 110. The tube 108 is integral with a disk 111, which is screwed into the top of an annular receptacle 112, having perforations 113, in its outer walls which are surrounded by a band 114, of felt or other absorbent material. An ink reservoir 115, is removably supported upon a stud 116. A spout 117, is extended over the funnel 110, which spout is adapted to be normally closed by means of a spring controlled valve 118. The felt covered cylinder described constitutes an ink roller which is adjusted to contact with the marking die as clearly shown in Figs. 3 and 4. The valve may be opened by pressing downwardly upon the valve-stem which permits the ink to flow from the reservoir to the hollow ink-roller from whence it is absorbed by the surrounding felt. This construction enables the flow to be carefully adjusted so as to insure uniformity of printing.

Inasmuch as the edges of the mail-pieces rest upon the flange 14, which tends to deflect them in the direction of its movement, we provide a shield or guard member 120, Figs. 1 to 8 inclusive, one end of which is attached to and supported by the shield 26, as shown at 121, Figs. 1 and 2, from whence it is carried in the groove 13, between the friction bands 11 and 12 to a point past the feed roller 69, where it is bent outwardly as shown at 122, thence in a curve substantially concentric with, but slightly outside of the periphery of the roller 9 for a short distance, when it is formed tangentially to said periphery as shown at 123, and rigidly attached to the table in any well known way. A shield 124, is located adjacent to the stacking wheel, while a follower 125, Fig. 1, is attached to a movable member 126, slidably fitted in a suitable guide-way upon the edge of the table. A slightly inclined receptacle 127, Fig. 1, serves as a temporary deposit for mail to be marked.

The operation of our improved machine is as follows: The mail-pieces 128 are placed against the shield 26 and the periphery of the main feeding wheel 9, which is caused to rotate in the direction indicated by the arrow. The retarding roller 67, which is actuated by the feed roller 58, through the intermediate train of gears described, serves to separate the mail-pieces in a well known way, so that only that one in contact with the feed wheel may be advanced. As each mail-piece is moved forward in its order, its forward end is brought into contact with the timing member 87, as shown in Fig. 3, thereby actuating the normally stationary die wheel and causing it to rotate by frictional contact with its periphery, as indicated in Figs. 4 and 6. We prefer in practice to place the friction feed surface 11, so as to slightly overhang the periphery of the die wheel, which fact accounts for the apparent distortion of the mail-piece in the views referred to, which is greater than would occur in actual practice and in no event should it be sufficient to cause injury to the letter.

The marking roller is intended to complete one revolution with each mail-piece and to finish its rotation before the complete passage of the latter, thereby causing the part 87 of the timing member to be brought into contact with the mail piece, thus pushing said timing member back into engagement with the part 95, of the arm 94 and rocking the elbow lever upon its pivot 92, against the action of the spring 98. This, in turn causes the movement of the arm 102, of the counting mechanism, thus registering the mail-piece. When the rotation of the marking roller is completed, the part 89 of the timing member is in engagement with the notch 96 and against the banking roller 91, when the die-wheel is brought to rest with the cut-away portion 84 opposite the main feed-wheel. This enables the remaining portion of the mail-piece to be carried past the die without obstruction and immediately upon its passage, the timing member is restored to its normal position by the pressure of the spring controlled arm 94, the rear end 89, of said member resting in the notch 96, as shown in Fig. 3, in position to pass the roller 91, upon the next impulse, while the forward end 87, lies in the mail-piece path, ready to engage the next succeeding mail-piece and repeat the operation.

In order to preserve the timing finger in the right position when no letter is passing by preventing any possibility of a backward movement, we prefer to form a stop 128, Figs. 3 and 7, upon the guard member 120. When the die is rotated by the passing mail-piece the end of said finger is brought into contact with the incline upon said stop and forced back against the action of the spring 98 until it snaps into position adjacent to the end of said stop as shown in Fig. 3.

Each mail-piece when marked is advanced into contact with the stacking wings while any tendency of the rear end to be deflected by the feed-wheel, is prevented by contact with the guard 120.

Figure 13:
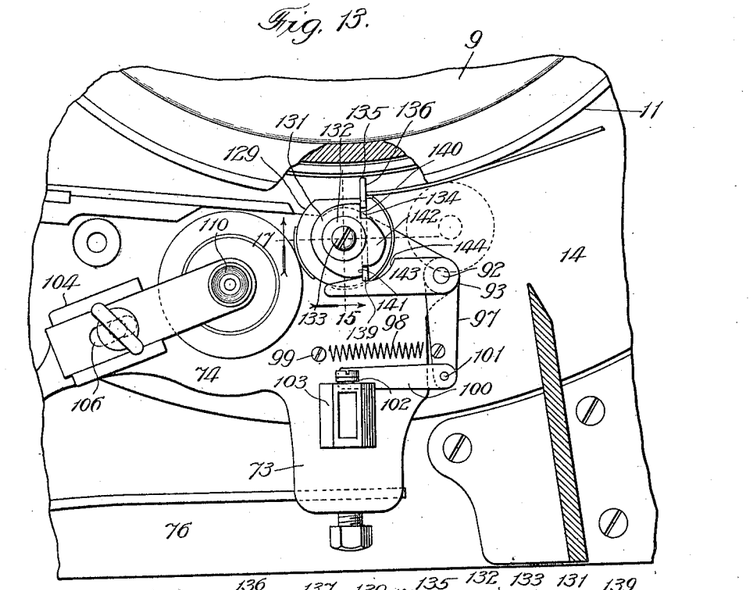
Figures 14, 15, 16, 17:
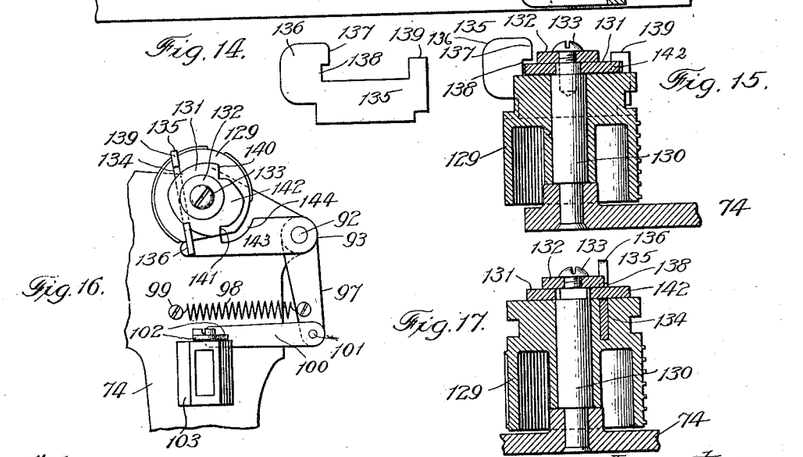

In Figs. 13 to 17 inclusive is shown a modified construction in which the timing finger, changed slightly in form, is differently located upon the die, and different means are represented for stopping and maintaining it in a predetermined normal position. The die or marking roller 129, is substantially the same as that previously described with the exceptions hereinafter stated. Said roller is loosely mounted upon a stud 130 attached to the part 74. A cam, generally designated by 131, is mounted upon said stud, being splined or otherwise fitted in place so as to maintain a predetermined relation thereto and is rigidly secured in position by means of a washer 132 and screw 133. A transverse groove 134, Figs. 13, 14 and 17, is formed in the die roller, so as to extend downwardly from the upper face thereof, said groove being substantially at right angles to the cut away portion of the die, but preferably eccentric to its axis. A trip finger generally designated by 135, is loosely fitted in the groove 134 so as to be moved longitudinally therein in the same manner as the finger 85. The top line of the main body of said finger is flush with the upper face of the roll, being held down by the cam plate 131. Said finger is provided with a forward and upward extension 136, adapted to stand normally in the mail-piece path and a rearward projection 137, beneath which is formed a notch 138 adapted to receive the cam-plate when the die is rotated. An upward projection 139, is formed upon the rear of said finger to engage that part of the cam which is opposite to the part entering the notch 138. The cam plate 131, is provided with a front shoulder 140, and a rear shoulder 141, both of which are adapted to be in alinement with the inner edge of the groove 134, when the die roller is in a normal position. An extension 142 is formed upon the cam plate which is adapted to cover the body of the finger 135 and to stand between the parts 138 and 139. An arm 143, which is the equivalent, slightly modified, of the arm 94, previously described and shown in Figs. 3 and 4, is rigidly attached in the same manner to the sleeve 93, and adapted to be controlled in precisely the same way by the arm 97 and spring 98. That portion of the cam plate 131, at the left of the finger is extended farther from the center of the die roller than that at the right, but so formed that when the finger is actuated by a moving mail-piece, said portion of the cam-plate 131 is free to enter the notch 138 of the finger so as to hold said finger properly extended during the rotation of the die. At the same time the rear part 139, is adapted to bear against the edge of the extension 142, which is properly shaped to permit said finger to be moved with the die. Upon completing substantially a half revolution of the die, the forward end of the finger passes above the tapered end of the arm 143 as shown in Fig. 16. During the next half of the revolution, the rear end of the finger is caused to contact with the arm 143 which, when the revolution is completed, causes the finger to snap into position with the side of the part 139, against the shoulder 141, and its inner edge against the projection 142, in the manner shown in Figs. 13 and 15. Inasmuch as the cam is stationary, it follows that the shoulder 141, forms a stop to effectually prevent a backward movement of the finger and die roller. The arm 143 is formed with a proper curve as shown at 144, to permit the movement of the finger when actuated by a mail-piece, while exerting a yielding pressure thereon until the movement is initiated, so as to avoid contact with the shoulder 140 and insure the entry of the cam plate in the notch 138. Previous to this action, however, it is obvious that the shoulder 140 will be engaged for an instant by the finger so as to insure the stopping of the die in its normal position.

We do not wish to be limited to the precise construction shown, nor to the specific combination described, as it is evident that either may be varied without departing from the spirit of the invention. This is especially true of the combined feed-wheel and impression roller, which is adapted to be used with varying forms of separating, marking or stacking mechanism. It is obvious that the same may be used with a continuously rotating die as well as with one normally at rest.

Having thus described our invention, we claim:

1. The combination with a rotary marking die normally at rest and means for feeding mail-pieces thereto, of a longitudinally movable member mounted upon said die, said member normally extending transversely of the mail-piece path and means for arresting said member to stop the die on a normal position.

2. The combination with a rotary marking die normally at rest and means for feeding mail-pieces thereto, of a longitudinally movable member mounted upon said die, said member normally extending transversely of the mail-piece path, means for arresting said member to stop said marking die in a normal position and means for yieldingly holding said longitudinally movable member into said mail-piece path.

3. The combination of a rotary marking die normally as rest and means for feeding mail-pieces thereto, of a longitudinally movable member mounted upon said die, means for causing said member to extend transversely into the mail-piece path when the die is at rest and means for arresting the movement of said die upon the completion of each revolution.

4. In a mail-marking machine, the combination with a rotary marking die, of a combined impression roller and feed-wheel, said wheel being provided with a laterally projecting flange arranged to extend beneath said marking die to form a carrying support for mail-pieces, a longitudinally movable member mounted upon said die, said member being arranged to normally extend across the mail-piece path and means for arresting said member in a normal position while leaving it free to be successively actuated by passing mail-pieces.

5. The combination with a rotary printing couple, one member of which comprises a marking and the other a platen element, of a mail-piece support comprising a disk or flange-like element extending laterally from the periphery of said platen, and a timing element mounted transversely upon said marking member and extending normally into the mail-piece path.

6. The combination with a rotary printing couple, one member of which comprises a marking element normally at rest and the other a platen element, of a mail-piece support arranged to extend beyond the periphery of said platen, a timing element arranged to extend into the mail-piece path, said timing element being mounted transversely upon said marking element and means for holding said marking element in a normal position.

7. In a mail marking machine, the combination of a juxtaposed printing couple consisting of primary and secondary members, the former having a peripheral printing die, a portion of the periphery of which is cut away and the other a peripheral friction surface adapted to act conjointly as an impression and feeding surface, means for continuously rotating said secondary member, a timing member mounted upon said primary member and arranged to project into the mail-piece path, and means for yieldingly holding said primary member at rest in a normal position with said cut-away portion opposite to said secondary member.

8. The combination with a rotary marking die normally at rest, a portion of the periphery of said die being cut-away, of a combined impression roller and feed wheel provided with a horizontal flange arranged to extend beyond its periphery and beneath said die, means for actuating said feed-wheel, a longitudinally slidable timing member transversely mounted upon said die with one end between the ends of said cut-away portion and means for yieldingly holding said timing member in a normal position with said end projecting into the mail-piece path.

9. The combination with a marking die normally at rest, and a continuously rotated impression roller adapted to feed mail-pieces by frictional contact to said die, of a longitudinally slidable timing member transversely mounted upon said die, said member being adapted to project in one or another direction beyond the periphery of said die, according as said member is in a normal or abnormal position, a stop for engaging said timing member when abnormally projected to arrest said die upon arriving at a normal position in the path of its rotation and yielding means for engaging said timing member and causing its forward end to extend into the mail-piece path.

10. In a mail marking machine, the combination with a rotary marking die, of a combined impression roller and feed-wheel, both mounted upon vertical axes, said wheel being provided with a laterally projecting flange arranged to extend beneath said marking die to form a path and support for the lower edge of mail-pieces, a feed-roller upon the same side of the mail-piece path as said die and means for yieldingly pressing the same against the periphery of said feed-wheel.

11. In a mail marking machine, the combination with a rotary marking die, of a combined impression roller and feed-wheel, said wheel being provided with a laterally projecting flange arranged to extend beneath said marking die to form a carrying support for mail-pieces, feed rollers upon the same side of the mail-piece path as said die, one of said rollers being above and the other in advance of said die and means for yieldingly pressing said rollers against said feed wheel.

12. The combination with a rotary marking die normally at rest, and means for feeding mail-pieces thereto, of a longitudinally slidable timing member mounted upon said die in position to stand normally at substantially right angles to the mail-piece path with its forward end extending across said path, said member being of a length to cause its rear end to extend beyond the periphery of the die-wheel when pushed back by the presence of a mail-piece in said path, a stop for engaging said member when so extended to arrest the die in a normal position upon the completion of one revolution, and spring-pressed means for engaging the rear end of said member to move it longitudinally into a normal position after the passage of a mail-piece.

13. The combination with a rotary marking die normally at rest and means for feeding mail-pieces thereto, of a longitudinally slidable timing member mounted upon said die in position to stand normally at substantially right angles to the mail-piece path, with its forward end extending into said path, said timing member being of a length to cause its rear end to extend beyond the periphery of the die wheel when held back by the presence of a mail-piece in said path, a stop for engaging said member when so extended to arrest the die upon the completion of one revolution, spring actuated means for engaging said member to move it longitudinally into the mail-piece path after the passage of a mail-piece and means for yieldingly holding said die in a normal position.

14. The combination with a rotary marking die, normally at rest and means for feeding mail-pieces thereto, of a longitudinally slidable timing member mounted upon said die in position to stand normally at substantially right angles to the mail-piece path with its forward end extending across said path, said timing member being of a length to cause its rear end to extend beyond the periphery of the die wheel when held back by the presence of a passing mail-piece in said path, a stop in position to engage said member when so extended to arrest the movement of the die upon the completion of one revolution, spring actuated means for engaging said member to move it longitudinally into the mail-piece path after the passage of a mail-piece, a counting mechanism and means for connecting the same with said spring actuated means.

15. In a mail-marking machine, the combination with a rotary marking roller normally at rest, that portion of said roller normally adjacent to the mail-piece path being cut away, of a combined impression roller and feed wheel, said wheel being provided with a projecting flange arranged to extend beneath said marking die to form a path and support for the lower edges of the mail pieces, a swinging spring-controlled arm for yieldingly supporting said marking roller, a feed roller in normal contact with the periphery of said feed-wheel, means for yieldingly holding the same against said feed wheel, a retarding roller, means for yieldingly holding the same in a normal position adjacent to said feed-wheel and actuating means for driving said retarding roller.

16. In a mail-marking machine, the combination with a rotary marking roller normally at rest, that portion of said roller normally adjacent to the mail-piece path being cut away, of a combined impression-roller and feed-wheel, said wheel being provided with a projecting flange arranged to extend beneath said marking-roller to form a path and support for the lower edges of the mail-pieces, a swinging spring pressed arm for yieldingly supporting said marking roller, means mounted upon said marking-roller and extending normally into the mail-piece path for initiating the movement of said roller by contact with a mail-piece, a secondary swinging arm, means for yieldingly pressing its free end toward said feed-wheel, a feed-roller mounted upon said arm above said marking-roller to contact with said feed-wheel, and yielding means for pressing said feed roller against the periphery of said feed-wheel.

17. In a mail-marking machine, the combination with feeding mechanism and a rotary marking die normally at rest, of a timing member mounted upon said die, said member being free to slide longitudinally in a suitable guideway, of a forwardly and upwardly projecting portion arranged to stand normally in the mail-piece path, a downwardly extended portion arranged to extend rearwardly beyond the periphery of the marking die during the passage of a mail-piece, a stop for engaging said portion when so extended and yielding means for pressing said member forward into the mail-piece path when engaged by said stop, whereby said rear portion may, when in a normal position, be free to pass said stop and said forward portion to ride above it during the rotation of the marking die.

In testimony whereof, we have signed this specification in the presence of two subscribing witnesses, this 25th day of October, 1911.

JAMES REHAK.
JOHN H. MADIGAN.

Witnesses:
DAVID H. FLETCHER,
JENNIE L. FISKE.